Oct. 5, 1937. W. E. PHILIPS ET AL 2,094,748
BELT CONVEYER
Filed July 9, 1936   3 Sheets-Sheet 2
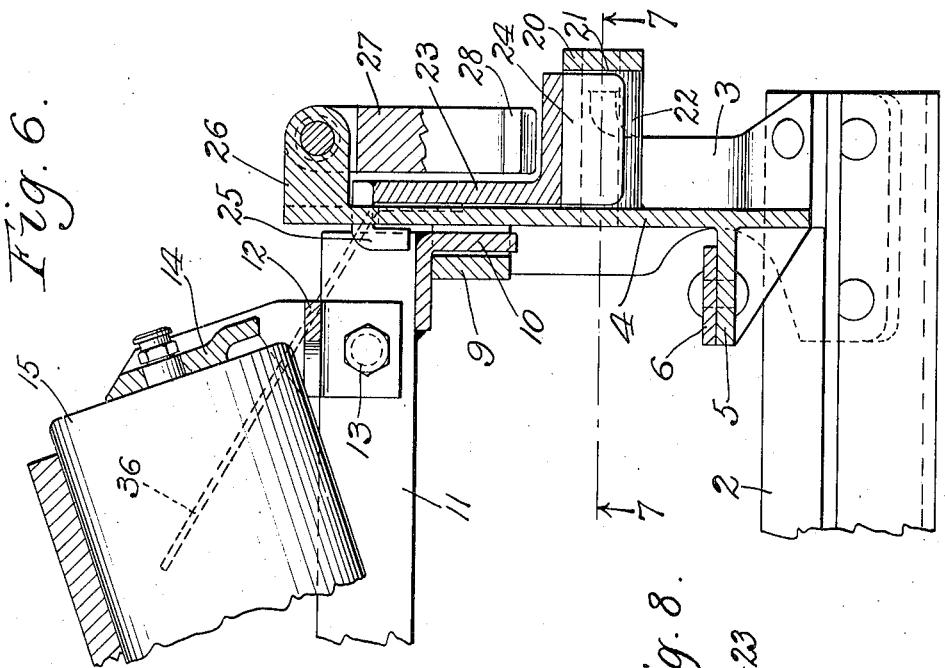
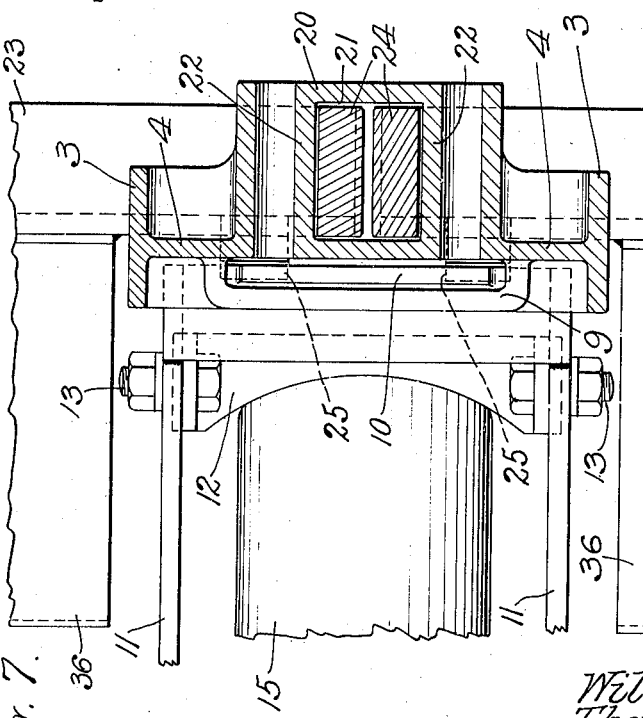
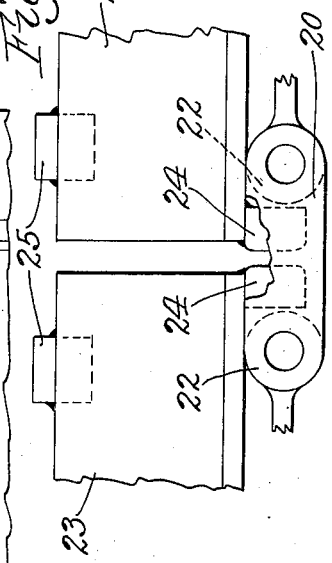
Inventors
William E. Philips
Thomas M. Harris
by Parker & Carter
Attorneys Oct. 5, 1937.    W. E. PHILIPS ET AL    2,094,748
BELT CONVEYER
Filed July 9, 1936    3 Sheets-Sheet 3
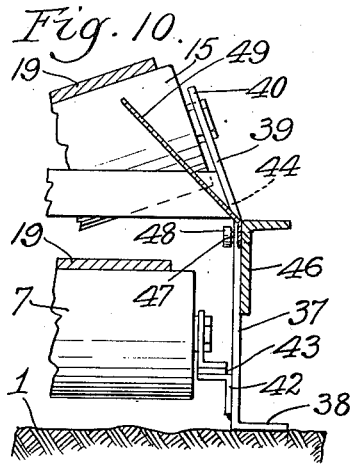
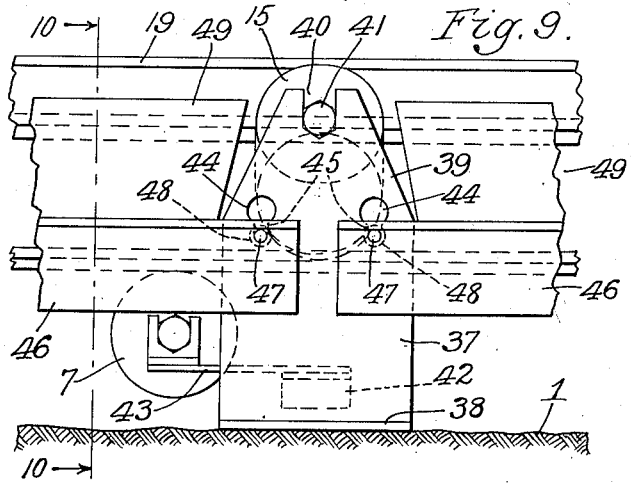
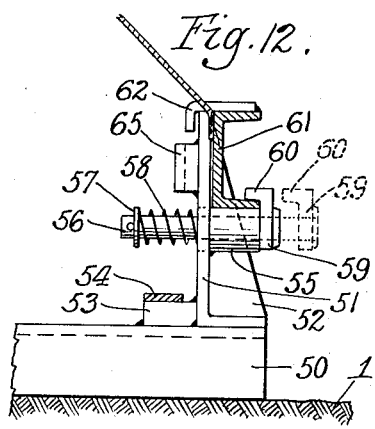
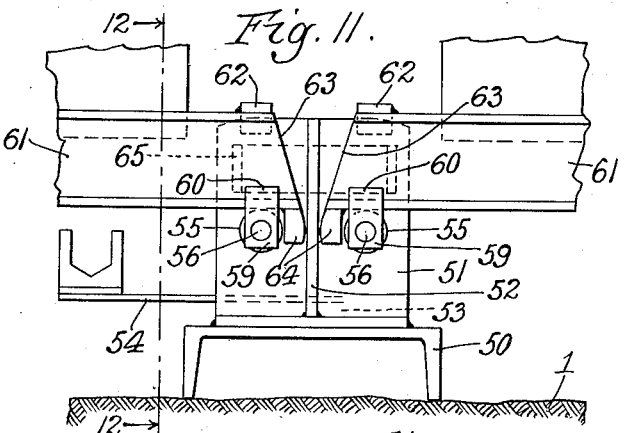
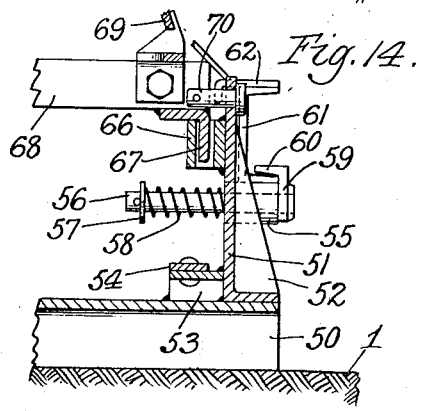
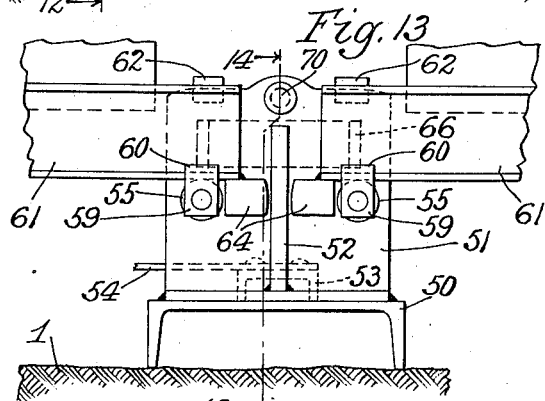
Inventors
William E. Philips
Thomas M. Harris
by Parker & Carter
Attorneys.

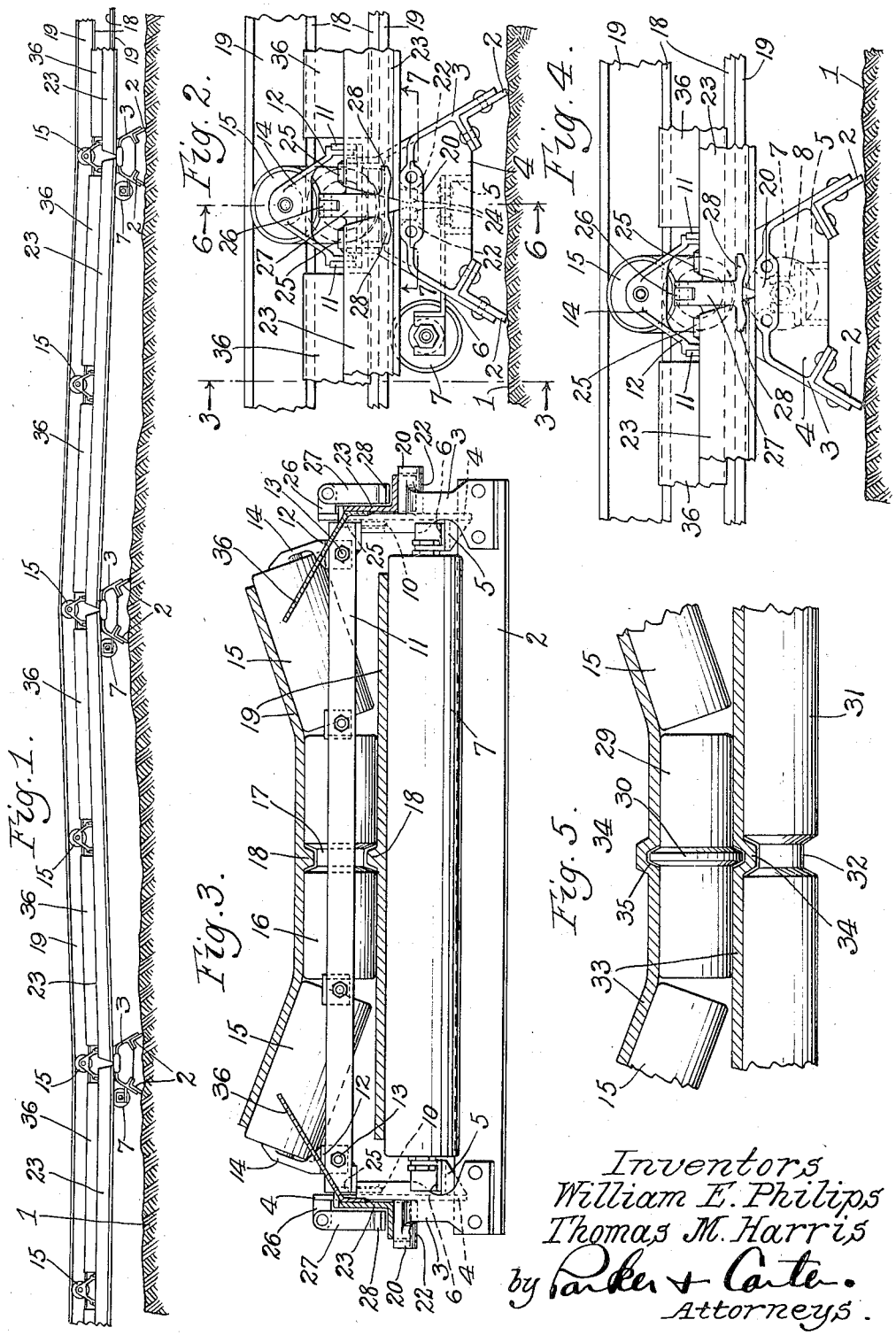

Patented Oct. 5, 1937

2,094,748

UNITED STATES PATENT OFFICE 2,094,748

BELT CONVEYER

William E. Philips, Oak Park, Ill., and Thomas M. Harris, Indianapolis, Ind., assignors to Link-Belt Company, Chicago, Ill., a corporation of Illinois Application July 9, 1936, Serial No. 89,712

19 Claims. (Cl. 198—192)

This invention relates to a conveyer and while it may be used for many purposes an important purpose is to provide a conveyer suitable for use in underground and particularly restricted places where low overall height is important and where demountability and easy portability are important.

It is one object of the invention therefore to provide a conveyer which can be made in sections for ready handling and portability and which will have a minimum overall height, both for economy of space and for ease in shoveling material to or upon the conveyer. Such conveyers are frequently used in mines where material is shoveled upon the conveyer and a reduction in the height of the conveyer simplifies and facilitates the shoveling.

Another object is to provide means in connection with such a conveyer for guiding both the conveying or troughing run and the return run with a minimum of height and it is an object of the invention, therefore, to provide such a guiding means in which the height of the conveyer need not be increased over that which would otherwise be required for the diameter of the roll and the thickness of the belt.

Another object is to provide means for guiding the roll and for protecting the belt and particularly the return run so that coal and other material being handled does not fall and cannot be thrown upon the upper surface of the return run of the belt to get between it and the idler and other rollers. Experience has shown that where the return run is covered or boxed in, fine coal or other fine material may crowd in beneath, upon and generally about the conveyer and particularly the return run, and clog it and an operator cannot readily remove this accumulation where the return run is directly boxed in. It is an object of the invention therefore to provide means for protecting the return run without enclosing it and in the present invention the return run is not completely boxed in and an operator can always conveniently get at it to remove any such accumulated material.

The inclined shield shown prevents coal or other material from falling on the return run, but leaves the bottom of the conveyer open and prevents coal from falling directly upon the return run or being carried to the idlers.

Another object is to provide in a conveyer of the type indicated ready demountability and positive locking together of the parts so that the conveyer may be readily installed and removed for reinstallation elsewhere and yet will remain positively held together after assembly. Another object is to provide such means for securing the sections together that the conveyer adapts itself readily to unevenness and inequality of the surface upon which it must rest.

Other objects will appear from time to time in the specification and claims.

The invention is illustrated more or less diagrammatically in the accompanying drawings, wherein:—

Figure 1 is a side elevation of one form of the invention installed on an uneven surface;

Figure 2 is a detailed side elevation on an enlarged scale;

Figure 3 is a transverse section taken at line 3—3 of Figure 2;

Figure 4 is a view generally similar to Figure 2 but showing a modification in the mounting of one of the idlers;

Figure 5 is a detailed sectional view generally similar to Figure 3 showing a modified form of belt and idler roller;

Figure 6 is a vertical transverse sectional detail taken on an enlarged scale at line 6—6 of Figure 2;

Figure 7 is a generally horizontal transverse sectional detail taken at line 7—7 of Figure 6;

Figure 8 is a side elevation with parts broken away illustrating the side rail construction of Figures 2 and 4, modified;

Figure 9 is a side elevation generally similar to Figures 2 and 4 illustrating a modified construction;

Figure 10 is a transverse generally vertical sectional detail taken at line 10—10 of Figure 9;

Figure 11 is a side elevation generally similar to Figure 9 and showing a further modification;

Figure 12 is a transverse generally vertical sectional detail taken at line 12—12 of Figure 11;

Figure 13 is a side elevation generally similar to Figures 9 and 11 and showing a further modified form; and Figure 14 is a transverse generally vertical sectional detail taken at line 14—14 of Figure 13.

Like parts are designated by like characters throughout the specification and drawings.

As shown in the assembly view of Figure 1, one form of the conveyer is installed on an uneven ground or surface 1. This may be the floor of a mine or any other surface. A plurality of conveyer sections are shown in that figure assembled on a plurality of idlers carrying and section supporting frames. In that form they are shown as built up A-frames although they might otherwise be made. The parts are shown in greater detail in Figures 2, 3, 4, 6, 7, and 8. In the form shown in the figures just mentioned each frame assembly comprises a pair of cross members 2, which as shown are of angular cross section but might be of any other desired shape and serve as ground contacting parts. To each pair of these is secured at each end an A-frame 3, having a web portion 4 to the inside of which is mounted a base 5 upon which a spring roller supporting member 6 is positioned. This member 6 carries at its outer end an idler roller 7 provided with suitable bearings which are not illustrated in detail as they form no essential part of the invention. In the modification shown in Figure 4, the roller 7 is mounted in bearing supports 8 which are themselves mounted directly upon the members 5. For some purposes it is advantageous to carry the roller on the spring mounting of Figure 2 because when this is done the idler roll cannot jam against the troughing roller since it is vertically off-set from it. Where there is danger of material falling upon the upper surface of the return run of the belt and being carried between it and the idler roller, jamming could occur and it is preferable therefore for certain installations to mount the rollers out of vertical alignment as shown in Figure 2 and to provide a spring mounting of that figure. For certain other installations it is satisfactory to omit the spring mounting and to mount the rollers in vertical alignment as shown in Figure 4.

Upon its inner face each A-frame 3 is provided with a stirrup-like member 9 within which a hook 10 of a roller carrying cross frame is removably positioned. This cross frame may comprise two transverse members 11, 11 which are secured together adjacent their ends by the hook member 10 and carry a member 12 which member is preferably bolted in place by bolts 13 and which carries a bearing support 14 for a troughing roller 15. Each troughing roller assembly comprises two such troughing rollers 15 and a central guiding roller 16 which in the form shown in Figure 3 particularly, is provided with a groove 17 into which a raised portion 18 of the belt 19 fits. As shown particularly in Figure 3, the rollers 16 engage both the upper or conveying run and the lower or return run of the belt, the raised portion 18 being thus twice engaged in the groove 17 of each roller and this roller serving as a guiding roll both for the upper and lower runs of the belt.

Intermediate its top and bottom each A-frame is provided with means for removably receiving side frame members. In the forms illustrated in the first eight figures the frame receiving means comprises a lateral enlargement 20 formed preferably integrally with the web portion 4 and having a socket portion 21 provided on two sides with rounded margins formed by the rounded or curved members 22, 22. The side frame members may be of any shape but as shown in the first eight figures are of angular section and comprise parts 23, 23. At each end, each of the members 23 is provided with a downwardly projecting lug 24 to fit into the socket 21. It will be noticed that the rounded portion 22 bears against the lower flange of the frame member 23 and thus furnishes a bearing portion about which the side frame member may turn to accommodate for inequality in the ground surface. Adjacent each end each side frame member 23 is provided with a hook portion 25 which hook portion hooks over and engages the upper edge or any other suitable part of the A-frame. Pivoted upon a perforated lug 26 or otherwise mounted upon the A-frame is a latch 27 having a laterally extended lower portion 28. As shown in detail in Figure 6 and elsewhere in the figures, this latch when in the position of that figure prevents vertical displacement of the side frame members and so holds the parts in assembly.

As illustrated in Figure 5, there is shown a modified form of belt and roller construction. The troughing rollers 15 are as previously shown and described but instead of the grooved center roller 16 of Figure 3 there is provided a roller 29, which instead of the groove 17, has an outwardly projecting flange or raised portion 30. To co-operate with this and with the belt, instead of the straight roller 7 there is provided a roller 31 which is grooved as at 32. A belt 33 is provided which carries a raised portion 34 forming a groove 35 which runs lengthwise of the belt and thus the raised portion 30 of the roller 29 fits into the groove 35 of the belt 33 engaging the belt in the upper and lower run. In general the operation of the form shown in Figure 5 is the same as that of the forms shown in the earlier figures except that the belt is provided with a groove instead of a projection and correspondingly the guiding roller is provided with a projection instead of a groove. In both forms the roller which contacts the belt serves simultaneously to guide the upper and lower runs of the belt.

The lower part of the conveyer construction is left open for convenience in clearing away material which may accumulate under the belt. As a means of preventing material from falling upon the lower run of the belt a deflector plate 36 is secured by welding or otherwise to each of the side frame members 23. These deflector plates are angularly positioned and project between the upper and lower run of the belt and thus coal or other material falling below the upper run of the belt cannot fall upon the lower run but falls upon the deflector plate and is deflected outwardly and falls upon the ground or other supporting surface upon which the conveyer is positioned.

A modified form of the supporting frame construction and associated parts is shown in Figures 9 and 10. As there shown instead of the A-frame of the earlier figures, there is provided for each frame section a frame member 37 having a foot 38. Towards its upper end this member may be bent inwardly as at 39 and notched at 40 to receive the support 41 of the troughing roller 15. Adjacent its bottom each frame member 37 is provided with a support 42 for the spring arm 43 which supports the lower idler 7. Each of the frames carries a perforation 44 which has reduced portion 45. The side frame members 46 may be of any cross section but as shown are angular and each is provided adjacent each end with a pin 47 headed at 48. In the assembly of the parts the head of the pin is inserted through the perforation 44 and the shank of the pin is then moved downwardly into the reduced portion 45. A deflector plate 49 may be secured by welding or otherwise to each of the side frame members 46.

In the modified form of Figures 11 and 12 the frame assembly comprises a transverse foot member 50 which may be of any suitable section but as shown is channeled. This member extends across from one side of the conveyer to the other and has secured to it an upwardly projecting frame member 51 which may be flat as shown and have a reinforcing, stiffening and positioning web 52 on one face. A support 53 may be provided to carry the spring arm 54 upon which the idler roller is mounted. The roller is omitted from these figures. Each frame member 51 has on each side of the web 52 a hollow boss or socket 55 within which a pin 56 is positioned. The pin carries at one end a washer 57. It has about it a spring 58 which bears at one end against the washer 57 and at the other end against the frame member 51. The spring tends to hold the pin in the full line position of Figure 12. At its opposite end each pin carries a head 59 which has a laterally bent flange 60.

Side frame members 61 are provided each of which has at its upper edge, adjacent its end, a downwardly bent hook 62 which as shown particularly in Figure 12 hooks over and engages the upper edge of the frame 51. The side frame members 61 may be of any suitable section but as shown are channeled and are preferably inclined or cut away at their ends as at 63. At or near each end of each side frame member 61 is a rounded, downwardly projecting portion 64. These portions are in effect hooks and hook over the bosses 55 and may bear against the web member 52. In the assembly of the conveyer of this form the side frame members are placed in the position shown so that the upper hooks 62 engage the upper end of the frame member 51 and so that the lower hook portion 64 engages the bosses 55. To permit this the pins 56 with their heads 59 and 60 are pulled out to the dotted line position of Figure 12 and when the side frame members are in position, they are allowed under the influence of the springs 58 to return to the full line position and thus each part 60 of a head 59 engages the lower flange of a side frame member 61 and holds it against displacement. The members 64 are preferably given curved faces to facilitate relative tilting when the assembly is positioned on an uneven ground or floor surface. Each frame member 51 may be provided with a stirrup or saddle portion 65 to receive the troughing roller supports. These are omitted from Figures 11 and 12 but might be generally like any of the troughing rollers shown in the other figures.

The form of Figures 13 and 14 is in many respects similar to the form of Figures 11 and 12. A similar cross member 50 is used and a similar frame member 51 carrying a web 52 is also used. Other similar parts need not be redescribed.

In this form a stirrup or saddle portion 66, generally similar to that shown at 65 in Figures 11 and 12, is provided and within it a hook 67 is received. This hook is attached to a troughing roller frame 68 upon which the troughing roller assembly is carried. This assembly is not shown in detail but includes a bearing support 69. The rest of the details of this assembly are omitted as they form no essential part of the present invention. It is sufficient for the purpose of the invention that means are provided for demountably supporting the troughing roller assembly in the frame assembly. In order to prevent vertical displacement of the troughing roller assembly a pin 70 is movably positioned in a suitable perforation formed in the frame plate 51. In this position it fits over the hook portion 67 and holds it in place.

The arrangement of the hooks 59, 60 is the same as that shown and described in Figures 11 and 12. The side frame members are the same general shape as those shown in Figures 11 and 12 and similarly carry the rounded, downwardly projecting end members 64, as well as upper hooks 62.

It will be realized that whereas we have herewith shown and described a practical operative device, nevertheless many changes might be made in the size, shape, number and disposition of the parts without departing from the spirit of the invention and we wish, therefore, that our showing be taken as in a sense diagrammatic.

In particular, where the A-frames are shown in the earlier forms, these might be built up as shown of several parts or might be formed integrally or in any other manner.

With regard to the belts shown, we have shown a ridged and an indented belt. Either might be used and any number of ridges or indentations might be used and in a single belt there might be both ridges and indentations. Whatever the form of the belt, the pulley which contacts and guides it will be correspondingly shaped.

In view of the fact that the conveyer must frequently rest as a whole on an uneven floor, misalignment is a constant danger and the guided belt arrangement is important in preventing misalignment. The design illustrated and described herewith, because it furnishes complete guiding both for the upper and the lower run of the belt, avoids any danger of misalignment of the belt with respect to the pulleys, and the applicants utilize what is in effect an idler in the troughing roller assembly to secure complete and adequate guiding of both runs of the belt. The idler roller 7 or its equivalent can be raised to hold the return run in contact with each of the grooved rollers to assist in turning the idler. This is of some advantage because where the conveyer is installed on an extremely uneven surface there may be times when the upper run will be out of contact with the grooved roller. Thus this roller is driven by and guides the upper and lower runs of the belt.

The use and operation of the invention are as follows:

In general, whatever form of the invention is used, the installation will include a certain number of cross frame assemblies and a certain number of longitudinal side frame members. The cross frame assemblies are placed upon the floor which is to carry the conveyer and the removable side frame members are then secured to the cross frame assemblies either by the pins, the latches or by other means. The belt is positioned so that it engages and is guided by the roll, whether the belt be grooved and the roller flanged or the belt being flanged and the roller grooved or whether there is any other combination or modification of these features. There is also provided in the assembly a driving end where any suitable driving means and driving pulleys may be used, and at the opposite or head end a suitable mechanism is provided, including a pulley so that the conveyer assembly is complete. Whatever the details, the guiding rolls are in guiding contact with the belt at suitable intervals along the conveyer.

In Figure 1 there has been shown intermediate each of the transverse cross assemblies a second roller assembly. This may or may not be used, depending upon the conditions of operation and the length of sections. For many purposes it is desirable to put one or more of such roller assemblies intermediate the ends of the sections and they will ordinarily comprise the two troughing rollers 15 and a guiding roller such as the member 16 or 29. With the parts assembled, the belt driving mechanism is put in operation and material to be conveyed is deposited on the belt and is conveyed to a point of discharge from which it may be automatically discharged or otherwise removed.

We claim:

1. In combination in a conveyer, a head pulley and a tail pulley, a belt, a longitudinal guide portion formed upon said belt, an idler pulley in contact with said belt and positioned intermediate the ends of said belt, a corresponding guide portion formed on said idler pulley, the guide portion of the belt engaging with the guide portion of the pulley on the working run and on the return run of the belt and means below said belt for supporting the return run thereof in engagement with the idler pulley.

2. In combination in a conveyer, a head pulley and a tail pulley, a belt, a longitudinal guide portion formed upon said belt, an idler pulley in contact with said belt and positioned intermediate the ends of said belt, a corresponding guide portion formed on said idler pulley, the guide portion of the belt engaging with the guide portion of the pulley on the working run and on the return run of the belt, said belt and pulley guide portions comprising a depression on one member and a corresponding mating elevation on the other member and a pulley below said belt for supporting the return run thereof in close proximity with the idler pulley.

3. In combination in a conveyer, a head pulley and a tail pulley, a belt, a longitudinal guide portion formed upon said belt, an idler pulley in contact with said belt, a corresponding guide portion formed on said idler pulley, the guide portion of the belt engaging with the guide portion of the pulley on the working run and on the return run of the belt, and a second idler pulley in contact with said belt, and positioned to hold the return run of said belt in contact with said guiding idler pulley.

4. In combination in a conveyer, a head pulley and a tail pulley, a belt, a longitudinal guide portion formed upon said belt, an idler pulley in contact with said belt, a corresponding guide portion formed on said idler pulley, the guide portion of the belt engaging with the guide portion of the pulley on the working run and on the return run of the belt, said belt and pulley guide portions comprising a depression on one member and a corresponding mating elevation on the other member, and a second idler pulley in contact with said belt, and positioned to hold the return run of said belt in contact with said guiding idler pulley.

5. In combination in a conveyer, a head pulley and a tail pulley, a belt, a longitudinal guide portion formed upon said belt, an idler pulley in contact with said belt, a corresponding guide portion formed on said idler pulley, the guide portion of the belt engaging with the guide portion of the pulley on the working run and on the return run of the belt, said guiding portions comprising a depression in said belt and a corresponding mating raised portion on said idler pulley, and a second idler pulley positioned to contact the return run of said belt and to hold the same in contact with said first idler pulley, the said second idler pulley provided with a guiding portion shaped to receive the guiding portion of said belt.

6. In combination in a conveyer, a conveyer belt, means for driving the same, and separable supporting members, said members comprising transverse roller assemblies and separable side frame members, means on the pulley assemblies for receiving said side frame members and additional means permanently secured to said pulley assemblies for removably securing said side frame members in place.

7. In combination in a conveyer, a conveyer belt, means for driving the same, and separable supporting members, said members comprising tranverse roller assemblies and separable side frame members, means on the pulley assemblies for receiving said side frame members and additional means carried by said pulley assemblies for removably securing said side frame members in place, said receiving means comprising bearing portions and socket portions, the bearing portions shaped to receive and support the side frame members throughout a range of angular positions.

8. In combination in a conveyer, a conveyer belt, means for driving the same, and separable supporting members, said members comprising transverse roller assemblies and separable side frame members, means on the pulley assemblies for receiving said side frame members and for removably securing them in place, said receiving means comprising bearing portions and socket portions, the bearing portions shaped to receive and support the side frame members throughout a range of angular positions the side frame members shaped to be received by the bearing portions throughout a range of relative angular positions above and below the horizontal, and latch means on the transverse frames for holding the side frame members removably in position.

9. In combination in a conveyer, a conveyer belt, means for driving the same, and separable supporting members, said members comprising transverse roller assemblies and separable side frame members, means on the pulley assemblies for receiving said side frame members and for removably securing them in place, each transverse frame assembly including a troughing roller and an associated idler roller, said troughing roller being shaped to provide a guiding portion, said belt having guiding portions shaped to mate with and to be guided by the guiding portion of said last mentioned roller on both its upper and lower runs.

10. In combination in a conveyer, a conveyer belt, means for driving the same, and separable supporting members, said members comprising transverse roller assemblies and separable side frame members, means on the pulley assemblies for receiving said side frame members and for removably securing them in place, said receiving means comprising bearing portions and socket portions, the bearing portions shaped to receive and support the side frame members throughout a range of angular positions the side frame members shaped to be received by the bearing portions throughout a range of relative angular positions above and below the horizontal, the socket members shaped to retain the side frame members in position, socket penetrating members on the side frame members.

11. In combination in a conveyer, a conveyer belt, means for driving the same, and separable supporting members, said members comprising transverse roller assemblies and separable side frame members, means on the pulley assemblies for receiving said side frame members and for removably securing them in place, said receiving means comprising bearing portions and socket portions, the bearing portions shaped to receive and support the side frame members throughout a range of angular positions the side frame members shaped to be received by the bearing portions throughout a range of relative angular positions above and below the horizontal, the socket members shaped to retain the side frame members in position, socket penetrating members on the side frame members, and a latch means on the transverse frames for holding the side frame members removably in position.

12. In combination in a conveyer, a conveyer belt, means for driving the same, and separable supporting members, said members comprising transverse roller assemblies and separable side frame members, means on the pulley assemblies for receiving said side frame members and for removably securing them in place, said receiving means comprising bearing portions and socket portions, the bearing portions shaped to receive and support said side frame members throughout a range of angular positions the side frame members shaped to be received by the bearing portions throughout a range of relative angular positions above and below the horizontal, the socket members shaped to retain the side frame members in position, socket penetrating members on the side frame members, and latch means on the transverse frames for holding the side frame members removably in position, each transverse frame assembly including a troughing roller.

13. In combination in a conveyer, a conveyer belt, means for driving the same, and separable supporting members, said members comprising transverse roller assemblies and separable side frame members, means on the pulley assemblies for receiving said side frame members and for removably securing them in place, said receiving means comprising bearing portions and socket portions, the bearing portions shaped to receive and support the side frame members throughout a range of angular positions, the socket members shaped to retain the side frame members in position, socket penetrating members on the side frame members, and latch means on the transverse frame for holding the side frame members removably in position, each transverse frame assembly including a troughing roller and an associated idler roller, said troughing roller being shaped to provide a guiding portion, said belt having guiding portions shaped to mate with and to be guided by the guiding portion of said last mentioned roller.

14. In combination in a conveyer, a demountable belt supporting and guiding structure, including a plurality of transverse frame assemblies and a plurality of removably mounted longitudinal frame members, said transverse assemblies including transverse members and end frame members, said end frame members shaped to receive removably said longitudinal frame members and provided with seating portions adapted to receive said longitudinal members and to support them throughout a range of relative angular positions the side frame members shaped to be received by the bearing portions throughout a range of relative angular positions above and below the horizontal.

15. In combination in a conveyer, a demountable belt supporting and guiding structure, including a plurality of transverse frame assemblies and a plurality of removably mounted longitudinal frame members, said transverse assemblies including transverse members and end frame members, said end frame members shaped to receive removably said longitudinal frame members and provided with seating portions adapted to receive said longitudinal members and to support them throughout a range of relative angular positions the side frame members shaped to be received by the bearing portions throughout a range of relative angular positions above and below the horizontal, and movable latch means mounted on said end frame members for securing said longitudinal members removably in position.

16. In combination in a conveyer, a demountable belt supporting and guiding structure, including a plurality of transverse frame assemblies and a plurality of removably mounted longitudinal frame members, said transverse assemblies including transverse members and end frame members, said end frame members shaped to receive removably said longitudinal frame members and provided with seating portions adapted to receive said longitudinal members and to support them throughout a range of relative angular positions the side frame members shaped to be received by the bearing portions throughout a range of relative angular positions above and below the horizontal, and members formed on said end frames and adapted to receive removably and readily demountably a roller assembly.

17. In combination in a conveyer, a demountable belt supporting and guiding structure, including a plurality of transverse frame assemblies and a plurality of removably mounted longitudinal frame members, said transverse assemblies including transverse members and end frame members, said end frame members shaped to receive removably and readily demountably said longitudinal frame members and provided with rounded seating portions adapted to receive said longitudinal members and to support them throughout a range of relative angular positions, and deflector plates positioned on said longitudinal members the ends of said longitudinal members and of said deflector plates being shaped to remain out of contact with each other when adjacent longitudinal frame members are tilted throughout a predetermined arc above their points of support upon said seating portions, said deflector plates positioned to project under the working run of the belt and over the return run thereof.

18. In combination in a conveyer, a demountable belt supporting and guiding structure, including a plurality of transverse frame assemblies and a plurality of removably mounted longitudinal frame members, said transverse assemblies including transverse members and end frame members, said end frame members shaped to receive removably said longitudinal frame members and provided with rounded seating portions adapted to receive said longitudinal members and to support them throughout a range of relative angular positions, and members formed on said end frames and adapted to receive removably a roller assembly, and deflector plates positioned on said longitudinal members the ends of said longitudinal members and of said deflector plates being shaped to remain out of contact with each other when adjacent longitudinal frame members are tilted throughout a predetermined arc above their points of support upon said seating portions, said deflector plates positioned to project under the working run of the belt and over the return run thereof.

19. In a conveyer, a belt having a longitudinal guide portion, and an idler roller intermediate the ends of said conveyer, said idler roller having a corresponding guide portion, the guide portion of said idler roller being simultaneously in guiding relationship with the upper and lower run of said belt.

WILLIAM E. PHILIPS.
THOMAS M. HARRIS.